(12) United States Patent
Roach et al.

(10) Patent No.: US 10,743,464 B2
(45) Date of Patent: Aug. 18, 2020

(54) SYSTEM FOR ALIGNING SKID-MOUNTED EQUIPMENT ON AN AGRICULTURAL PRODUCT APPLICATOR

(71) Applicant: CNH Industrial America LLC, New Holland, PA (US)

(72) Inventors: William A. Roach, Lake Lillian, MN (US); Rex L. Ruppert, Benson, MN (US)

(73) Assignee: CNH Industrial America LLC, New Holland, PA (US)

( * ) Notice: Subject to any disclaimer, the term of this patent is extended or adjusted under 35 U.S.C. 154(b) by 113 days.

(21) Appl. No.: 15/684,574

(22) Filed: Aug. 23, 2017

(65) Prior Publication Data

US 2019/0059211 A1 Feb. 28, 2019

(51) Int. Cl.
| | |
|---|---|
| *A01C 23/00* | (2006.01) |
| *B62D 65/02* | (2006.01) |
| *B60P 3/30* | (2006.01) |
| *A01C 23/04* | (2006.01) |
| *A01B 76/00* | (2006.01) |
| *B62D 49/00* | (2006.01) |
| *A01M 7/00* | (2006.01) |

(52) U.S. Cl.
CPC ............ *A01C 23/008* (2013.01); *A01B 76/00* (2013.01); *A01C 23/047* (2013.01); *A01M 7/0082* (2013.01); *B60P 3/30* (2013.01); *B62D 49/00* (2013.01); *B62D 65/02* (2013.01)

(58) Field of Classification Search
CPC ...... B62D 21/12; B62D 49/00; B62D 49/065; B62D 65/02; B62D 65/024; B62D 65/16; A01C 23/008; A01C 23/047; A01B 76/00; B60P 3/30

USPC .......................................................... 280/785
See application file for complete search history.

(56) References Cited

U.S. PATENT DOCUMENTS

| | | |
|---|---|---|
| 3,566,588 A | 3/1971 | Dahlquist |
| 3,679,224 A | 7/1972 | Hatcher |
| 3,728,768 A * | 4/1973 | Mori ........................ E02F 3/386 |
| | | 172/274 |
| 3,760,883 A | 9/1973 | Birk |

(Continued)

FOREIGN PATENT DOCUMENTS

EP         2457752         5/2012

*Primary Examiner* — Frank B Vanaman
(74) *Attorney, Agent, or Firm* — Rebecca L. Henkel; Richard K. DeMille (57) ABSTRACT

An equipment skid is aligned on the frame of an agricultural product applicator defining substantially mutually perpendicular fore-aft, transverse and vertical axes of the frame, by utilizing an alignment system having a vertically extending frame mounting surface defined by the frame, and a vertically extending skid mounting surface defined by the skid. The frame and skid mounting surfaces are adapted for mating connection with one another to substantially align the skid with the frame along a substantially vertical mounting plane. A pair of laterally-spaced, juxtaposed, vertically extending skid alignment features are defined by the frame mounting surface, and a skid-mounted alignment block extending from the skid mounting surface is adapted for insertion between and into operative engagement with the pair of skid alignment features for aligning the skid with the frame on the vertical mounting plane.

20 Claims, 10 Drawing Sheets

(56) References Cited

U.S. PATENT DOCUMENTS

| | | |
|---|---|---|
| 4,180,342 A | 12/1979 | Layher |
| 4,210,210 A | 7/1980 | Ankenman |
| 4,530,406 A | 7/1985 | Hake et al. |
| 4,663,922 A | 5/1987 | Anderson et al. |
| 4,677,814 A | 7/1987 | Anderson et al. |
| 4,831,756 A * | 5/1989 | Huang .................... A47G 1/06 281/31 |
| 4,961,681 A | 10/1990 | Threatt |
| 5,401,056 A * | 3/1995 | Eastman .................. B60G 3/20 280/785 |
| 6,079,340 A * | 6/2000 | Flamme ............... A01B 79/005 111/178 |
| 6,199,894 B1 * | 3/2001 | Anderson ............. B62D 21/12 180/209 |
| 6,269,757 B1 * | 8/2001 | Kiest .................... A01C 23/024 111/119 |
| 6,415,872 B2 | 7/2002 | Myers et al. |
| 6,421,993 B1 | 7/2002 | Mackin et al. |
| 6,561,739 B1 * | 5/2003 | Garala ................... B62D 21/12 410/35 |
| 7,549,279 B2 | 6/2009 | Merant et al. |
| 7,740,189 B2 | 6/2010 | Meyer et al. |
| 8,123,284 B2 * | 2/2012 | Hedderly ............. B62D 27/023 296/193.06 |
| 8,555,994 B2 | 10/2013 | Van Den Engel |
| 9,839,176 B1 * | 12/2017 | Snyder ................... A01B 76/00 |
| 2005/0051672 A1 | 3/2005 | Dean et al. |
| 2005/0235890 A1 * | 10/2005 | Mariman ............... A01C 7/081 111/174 |
| 2014/0060401 A1 * | 3/2014 | Blunier ................ A01B 59/048 111/118 |

* cited by examiner

SYSTEM FOR ALIGNING SKID-MOUNTED EQUIPMENT ON AN AGRICULTURAL PRODUCT APPLICATOR

FIELD OF THE INVENTION

This invention generally relates to agricultural product applicators, and more particularly to mounting of equipment on such applicators.

BACKGROUND OF THE INVENTION

Modern agricultural practices rely heavily on timely application of agricultural products such as fertilizers and chemicals. Some of these products are applied in dry form using dry product spreading equipment, and others are applied in liquid form using sprayers.

It is advantageous to mount the dry and liquid product application equipment on separate skids, that can be interchangeably mounted on the same product applicator. Such skid-mounted equipment is typically large in size and heavy, weighing as much as several thousand ponds. Lifting the skid-mounted equipment into place typically requires the use of some sort of lifting arrangement.

The equipment-carrying skid must be precisely aligned on the frame of the applicator to properly interface with hydraulic and electrical connections, and mounting hardware that secures the skid to the frame. Also, the skid-mounted equipment must be properly positioned and secured on the applicator to properly balance the large loads of the application equipment and product on the frame of the applicator, so that the applicator can safely operate while travelling over uneven terrain, nits, ditches and the like, during application of the agricultural product.

In the past, skid-mounted equipment had to be manually guided onto the frame of the applicator in such a manner that mounting holes and features were properly aligned, often while the skid was dangling from an overhead crane or lifting device. It is desirable to provide an improved apparatus and method for aligning skid-mounted application equipment onto the frame of an applicator, in a manner that is more precise and less cumbersome than in prior approaches.

BRIEF SUMMARY OF THE INVENTION

The invention provides an apparatus and method for aligning an equipment skid on the frame of an agricultural product applicator defining substantially mutually perpendicular fore-aft, transverse and vertical axes of the frame, by utilizing an alignment system having a vertically extending frame mounting surface defined by the frame, and a vertically extending skid mounting surface defined by the skid. The frame and skid mounting surfaces are adapted for mating connection with one another to substantially align the skid with the frame along a substantially vertical mounting plane. A pair of laterally-spaced, juxtaposed, vertically extending skid alignment features are defined by the frame mounting surface. A skid-mounted alignment block extending from the skid mounting surface is adapted for insertion between and into operative engagement with the pair of skid alignment features for aligning the skid with the frame along the vertical mounting plane.

The invention may take a variety of forms, such as a system for aligning an equipment skid on an agricultural product applicator, or an agricultural product applicator having an equipment skid and a frame adapted for alignment of the skid on the frame by a skid alignment system according to the invention. The invention may also take the form of a frame or a skid incorporating aspects of a skid alignment system according to the invention.

One form of the invention provides, a system for aligning an equipment skid on the frame of an agricultural product applicator defining substantially mutually perpendicular fore-aft, transverse and vertical axes of the frame. The alignment system may include a vertically extending frame mounting surface defined by the frame, and a vertically extending skid mounting surface defined by the skid, with the frame and skid mounting surfaces being adapted for mating connection with one another to substantially align the skid with the frame along a substantially vertical mounting plane. The frame mounting surface may define a pair of laterally-spaced, juxtaposed, vertically extending skid alignment features. The alignment system may also include a skid-mounted alignment block extending from the skid mounting surface and adapted for insertion between and into operative engagement with the pair of skid alignment features for aligning the skid with the frame along the mounting plane.

In an alignment system according to the invention, the frame and skid may be further configured for mating contact along a substantially horizontal mounting plane, and the skid-mounted alignment block may be configured to be brought into position between the alignment features of the frame mounting surface by moving the skid parallel to the horizontal mounting plane as the vertically extending mounting surfaces of the frame and skid are brought into contact with one another along the vertical mounting plane.

In some forms of the invention, the skid alignment features may be facing edges of spaced, substantially parallel, vertically extending frame-mounted alignment bars fixedly attached to the frame and extending outward from the mounting surface of the frame. In other forms of the invention, the skid alignment features may be facing edges of an alignment slot in the frame mounting surface, of facing edges of other structures fixedly attached to or formed integrally with the frame mounting surface.

In practicing the invention, the frame and skid may be further configured for mating contact along a substantially horizontal mounting plane, and the skid-mounted alignment block may be brought into position between the alignment features of the frame mounting surface by moving the skid parallel to the horizontal mounting plane as the vertically extending mounting surfaces of the frame and skid are brought into contact with one another along the vertical mounting plane.

Some forms of the invention may include a second pair of laterally-spaced, juxtaposed, vertically extending skid alignment features defined by the frame mounting surface, and a second skid-mounted alignment block extending from the skid mounting surface and adapted for insertion between and into operative engagement with the second pair of skid alignment features for aligning the skid with the frame along the vertical mounting plane. The second set of skid alignment features may be provided by facing edges of a second set of spaced, substantially parallel, vertically extending frame-mounted alignment bars fixedly attached to the frame and extending outward from the mounting surface of the frame.

In some forms of the invention, the vertical mounting plane may be defined by an aft-facing, substantially vertical surface of the frame, such that the frame and skid mounting surfaces align the skid along the fore-aft axis of the frame, and the frame-mounted alignment bars and skid-mounted alignment blocks align the skid transversely on the frame.

In various forms of the invention, after the skid is aligned on the frame by the alignment system, the skid may be secured to the frame by fastening arrangements disposed along and extending through one or both of the vertical and horizontal mounting planes.

Other aspects, objects and advantages of the invention will be apparent from the following detailed description and accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain exemplary embodiments, there is no intent to limit it to those embodiments. On the contrary, the intent is to cover all alternatives, modifications and equivalents as included within the spirit and scope of the invention.

DETAILED DESCRIPTION OF THE INVENTION

Figure 1:
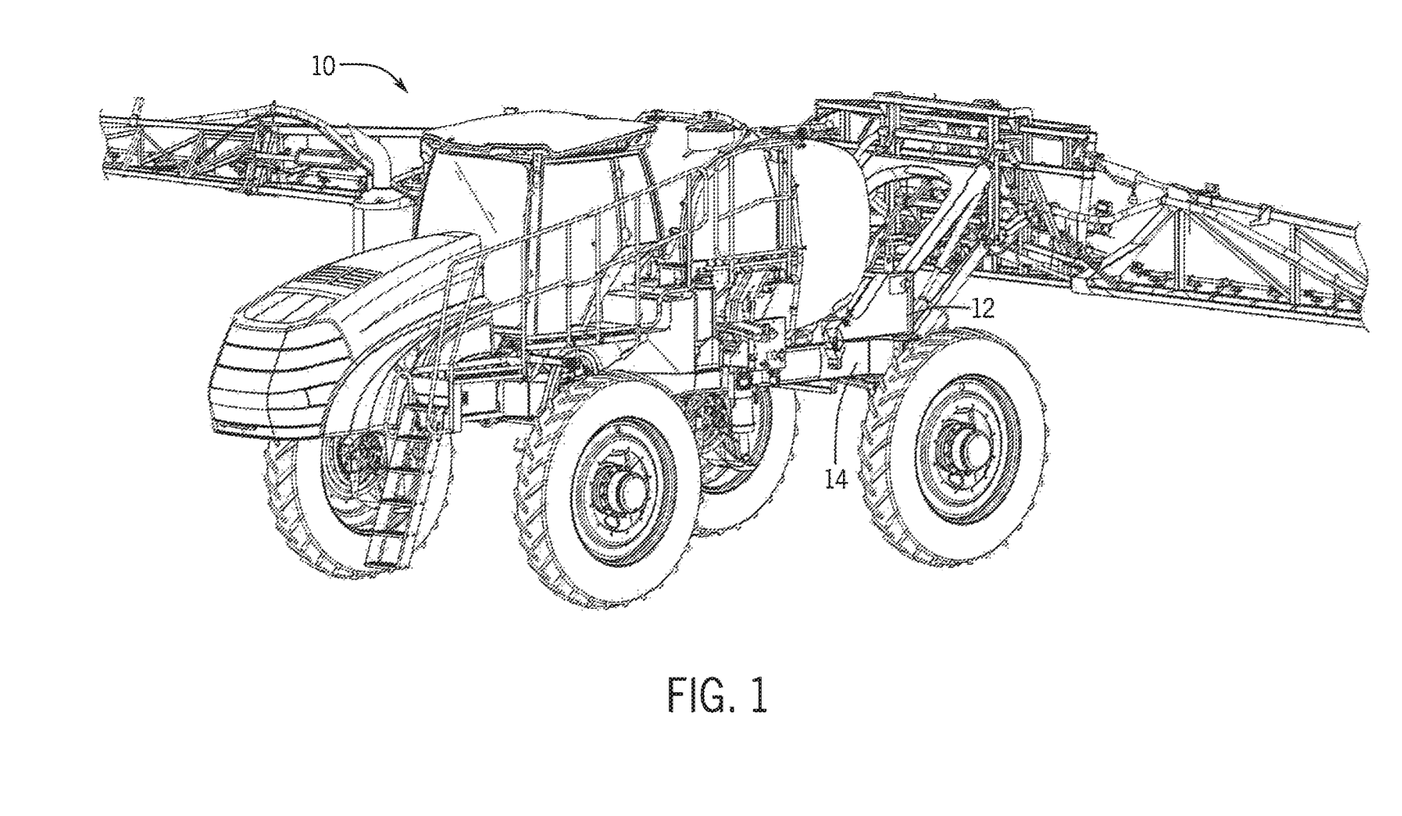
FIG. 1 is an isometric illustration of an exemplary embodiment of an agricultural product applicator having a skid-mounted agricultural product applicator aligned and mounted on a frame of the applicator by a skid alignment system and method, in accordance with the invention.
Figure 2:
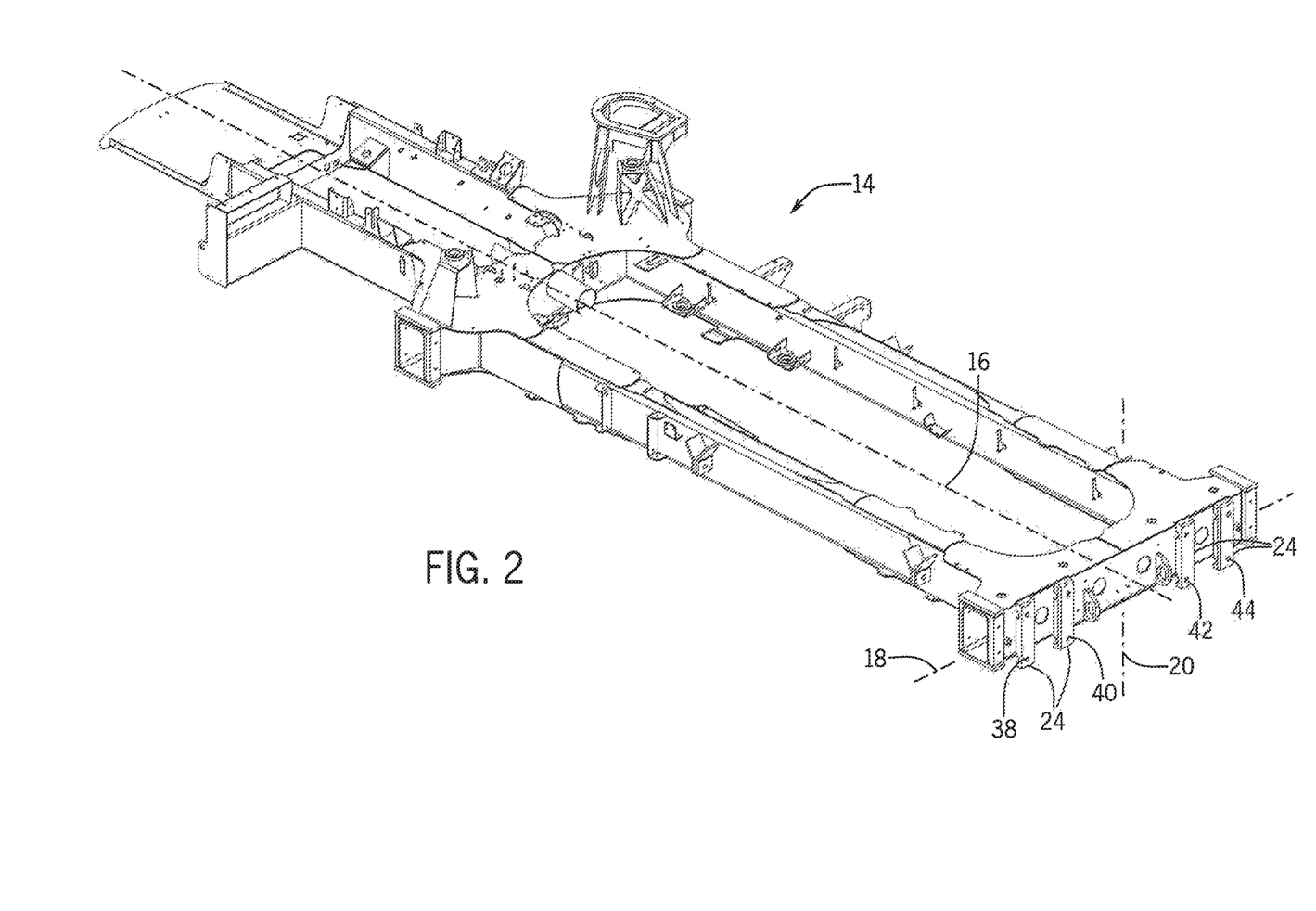
FIG. 2 is an isometric illustration of the frame of the applicator of FIG. 1, illustrating various aspects of an exemplary embodiment of the skid alignment system of the applicator of FIG. 1.
Figure 3:
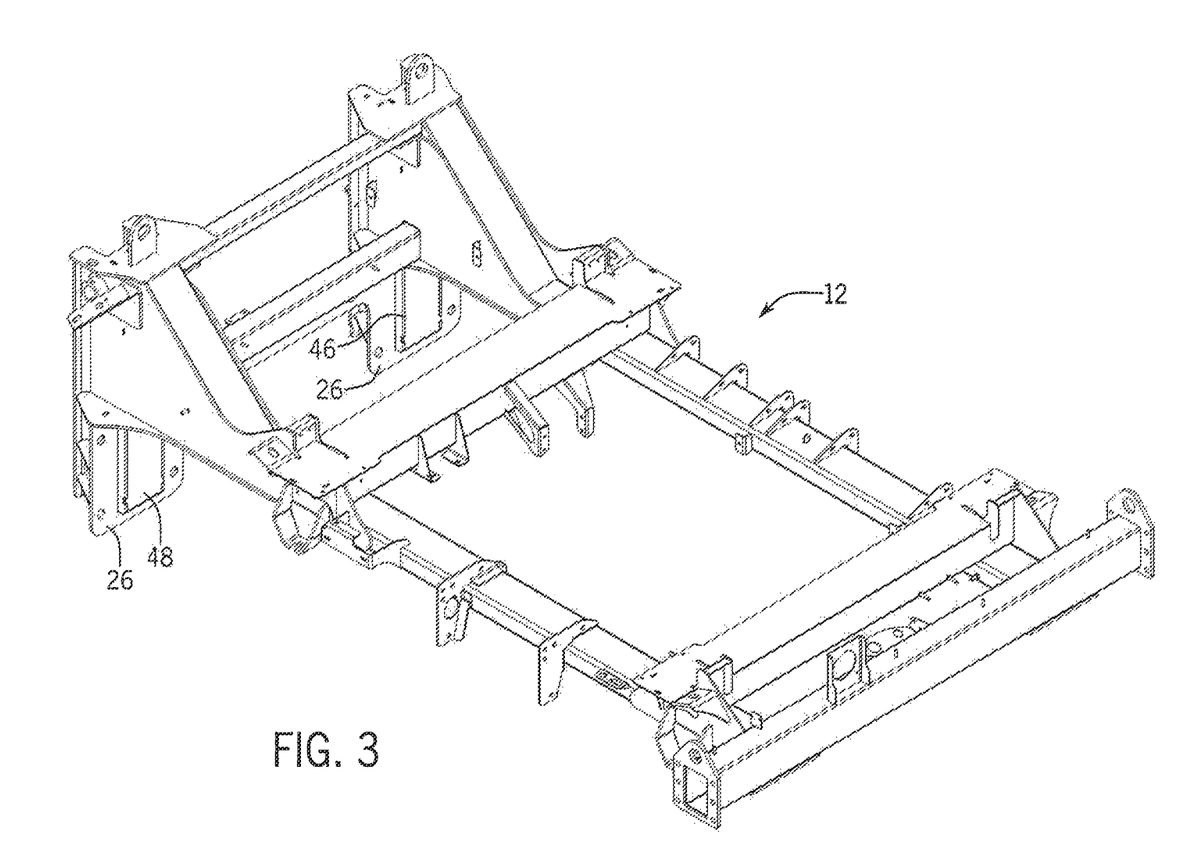
FIG. 3 is an isometric illustration of the skid of the applicator of FIG. 1, illustrating various aspects of an exemplary embodiment of the skid alignment system of the applicator of FIG. 1.

FIG. 1 shows an agricultural product applicator 10, comprising a skid 12 for mounting equipment on a frame 14 of the applicator 10. FIGS. 2 and 3 show the frame 14 and skid 12, respectively. As shown in FIG. 2, the frame 14 defines substantially mutually perpendicular fore-aft, transverse and vertical axes 16,18,20 of the frame 14.

As shown in FIGS. 2-7, the skid 12 and frame 14 are adapted for alignment of the skid 12 on the frame 14 by a method utilizing a skid alignment system 22 that brings together a vertically extending frame mounting surface 24 defined by the frame 14, and a vertically extending skid mounting surface 26 defined by the skid 12. The frame and skid mounting surfaces 24, 26 are adapted for mating connection with one another to substantially align the skid 12 with the frame 14 in the fore-aft direction along a substantially vertically extending mounting plane 28 including and defined by the frame mounting surface 24.

Figure 6:
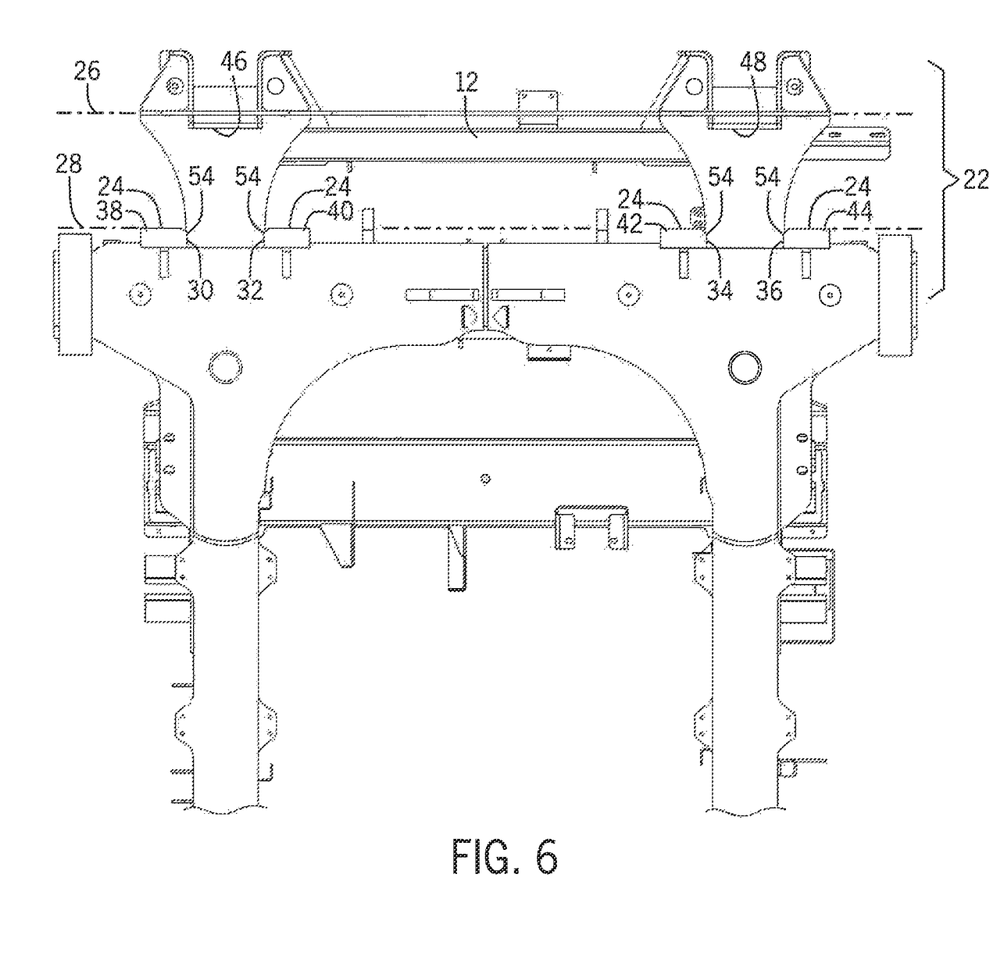
FIG. 6 is an orthographic bottom plan view, corresponding generally to FIG. 4, of the underside of the aft end of the frame, as the skid is aligned with the frame using the skid alignment system of the exemplary embodiment of the applicator of FIG. 1.
Figure 7:
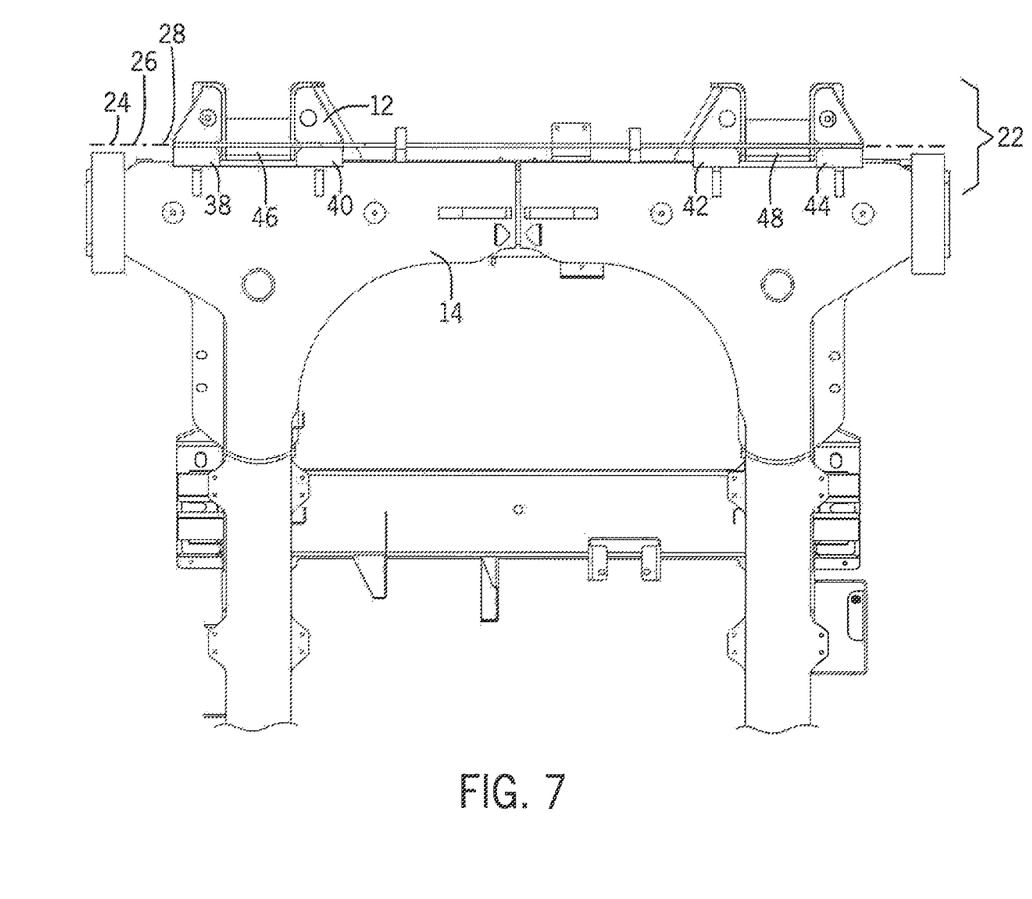
FIG. 7 is an orthographic bottom plan view, corresponding generally to FIG. 5, of the underside of the aft end of the frame, with the skid aligned on the frame using the skid alignment system of the exemplary embodiment of the applicator of FIG. 1.

As shown in FIGS. 2 and 6, in the exemplary embodiment of the applicator 10, the skid alignment system 22 also includes left and right pairs (viewed from the aft end of the frame 14) of laterally-spaced, juxtaposed, substantially parallel, vertically extending skid alignment features, in the form of facing edges (30,32 and 34,36) of left and right pairs of frame-mounted alignment bars (38,40 and 42,44). The alignment bars (38,40 and 42,44) have aligned aft-facing surfaces that define and form part of the frame mounting surface 24.

Figure 4:
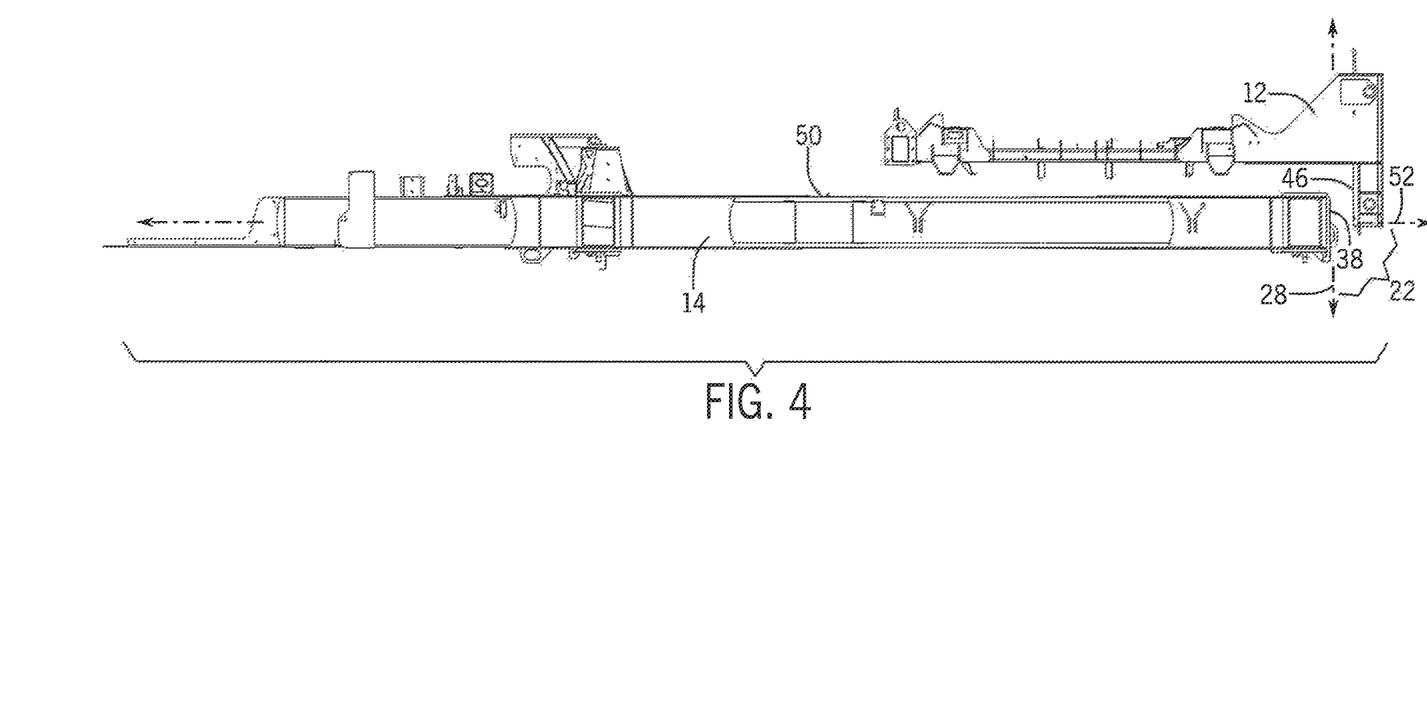
FIG. 4 is an orthographic side view of the skid being moved into alignment with the frame.
Figure 5:
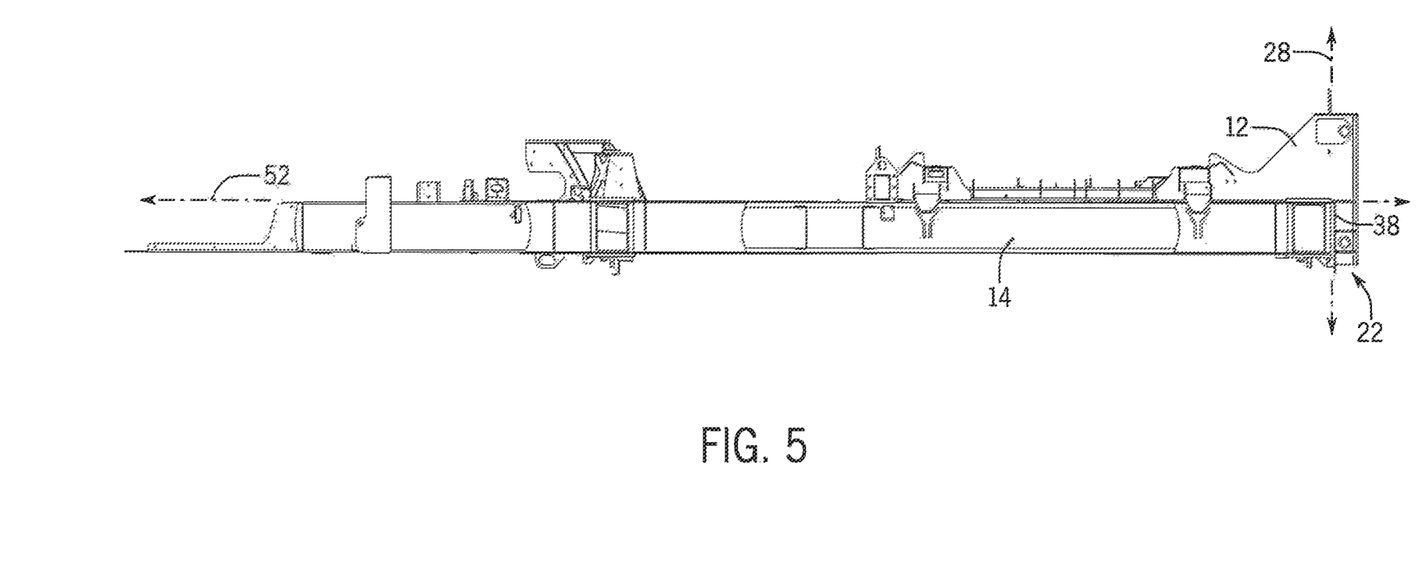
FIG. 5 is an orthographic side view of the skid resting on the frame, after being aligned along both a vertical and a horizontal mounting plane of the frame.

As shown in FIGS. 3 and 4, the skid alignment system 22, of the exemplary embodiment of the applicator 10, further includes left and right skid-mounted alignment blocks 46,48 extending from the skid mounting surface 26 and adapted for insertion respectively between, and into operative engagement with the left and right pairs of frame-mounted alignment bars (38,40 and 42,44) for aligning the skid 12 transversely with the frame 14 on the vertically extending frame mounting plane 28.

As shown sequentially in FIGS. 4-7, in the exemplary embodiment of the agricultural product applicator 10, the frame and skid 14,12 are further configured for mating contact along a substantially horizontally extending mounting surface 50 of the frame 14, that defines and forms part of a substantially horizontally extending mounting plane 52. To align the skid 12 on the frame 14, the skid-mounted alignment blocks 46,48 are brought into position between the alignment surfaces provided by the facing edges (30,32 and 34,36) of the left and right pairs of alignment bars (38,40 and 42,44) by moving the skid 12 parallel to the horizontal mounting plane 52, as the vertically extending mounting surfaces 24,26 of the frame and skid 14,12 are brought into operative contact with one another. Alternatively, the skid-mounted alignment blocks 46,48 can be brought into position above the channels formed between the alignment surfaces provided by the facing edges (30,32 and 34,36) of the left and right pairs of alignment bars (38,40 and 42,44), and then the skid can be lowered along the vertical mounting plane 28, to bring the vertically extending mounting surfaces 24,26 of the frame and skid 14,12 into operative contact with one another.

Once the skid 12 is properly aligned on the frame 14, the skid 12 is secured to the frame 14 with fastening arrangements (not shown).

As illustrated in FIG. 6, the alignment bars (38,40 and 42,44) and/or the blocks 46,48 may include beveled edges 54, or be otherwise configured to assist in guiding the blocks 46,48 into proper position for aligning the skid 12 on the frame 14.

Figure 8:
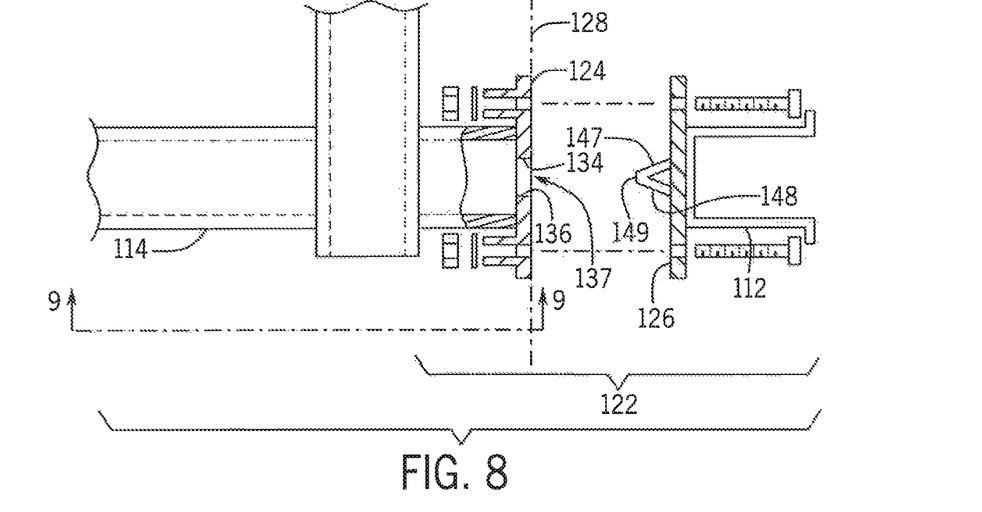
FIGS. 8-10 show an alternate embodiment of a skid alignment system, according to the invention, with FIG. 8 being a partial, orthographic, bottom view of a right rear corner of the frame of an applicator, in a manner similar to FIG. 6, and with FIGS. 9 and 10 being taken along lines 9-9 and 10-10 respectively.
Figure 9:
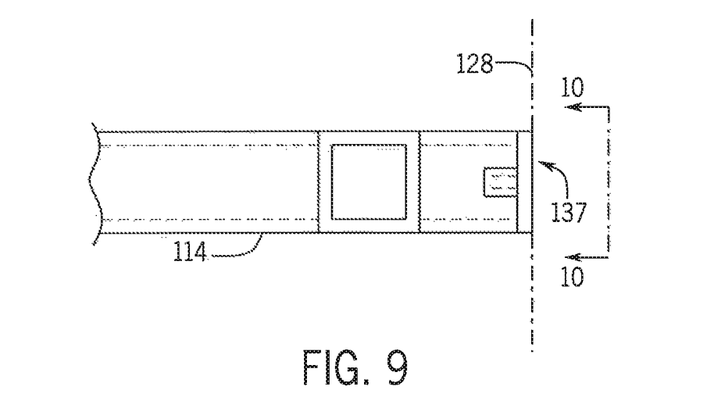
Figure 10:
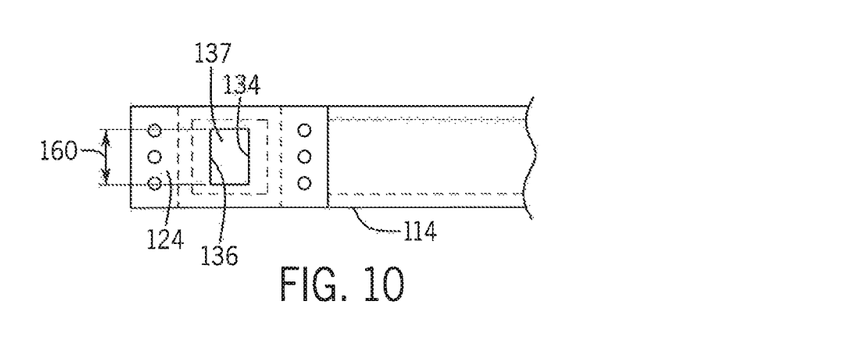

FIGS. 8-10 illustrate a first alternate embodiment of a skid alignment system 122, for aligning an equipment skid 112 on the frame 114 of an agricultural product applicator, in a similar manner to that described above with reference to the first exemplary embodiment of the applicator 10. The alternate embodiment of the alignment system 122 includes a frame mounting surface 124 defined by the frame 114, and a skid mounting surface 126 defined by the skid 112, with the frame and skid mounting surfaces 124,128 being adapted for mating connection with one another to substantially align the skid with the frame along a mounting plane 128 including and defined by the frame mounting surface 124.

A pair of laterally-spaced, juxtaposed, vertically extending skid alignment features are defined by opposite edges 134,136 of a slot 137 in the frame mounting surface 124. A skid-mounted alignment block 148 extends from the skid mounting surface 126 and is adapted for insertion between and into operative engagement with the pair of skid alignment features, formed by the edges 134,136 of the slot 137 for aligning the skid 112 with the frame 114 on the frame mounting plane 128. The skid alignment block 148 has sides 147,149 contoured to provide a pointed shape to the alignment block 148 for engaging the edges 134,136 of the slot 137 to facilitate guiding the skid 112 into alignment with the frame 114. As shown in FIG. 10, the slot 137 may be shaped to have a contour or dimension 160 that provides clearance for the alignment block 148 to allow the alignment block 148 to move, or float slightly, in a desired direction with the alignment block 148 engaging the edges 134,136 of the slot 137.

Figure 11:
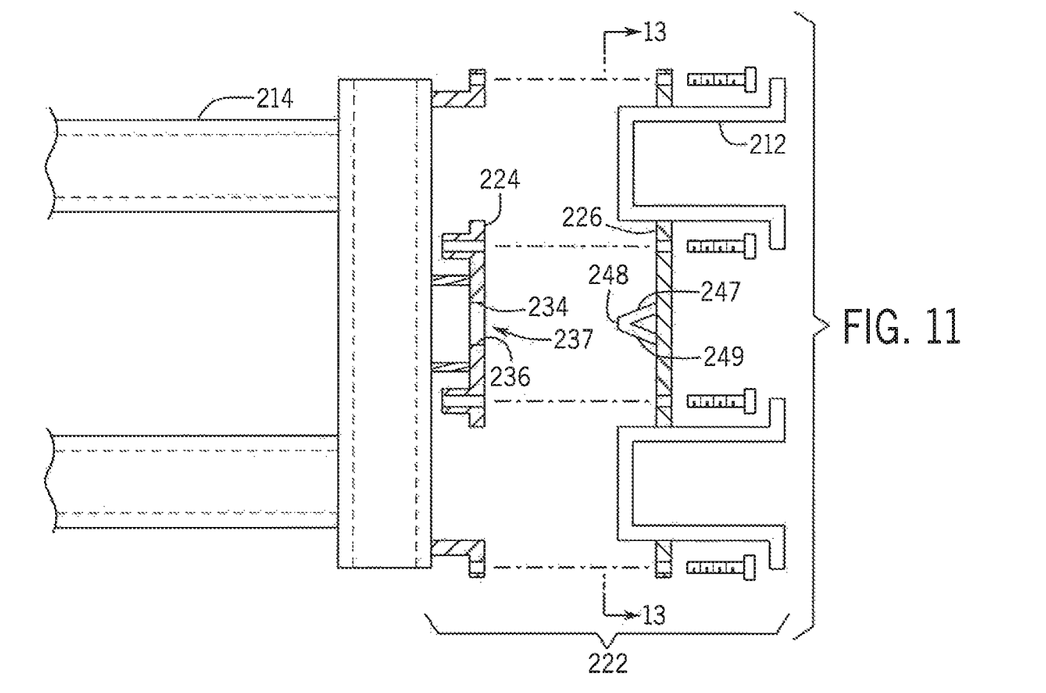
FIGS. 11-13 show a second alternate embodiment of a skid alignment system, according to the invention, with FIGS. 11 and 12 being a partial, orthographic, bottom views of an aft end of the frame of an applicator, in a manner similar to FIG. 6 and FIG. 7, and with FIG. 13 being taken along lines 13-13.
Figure 12:
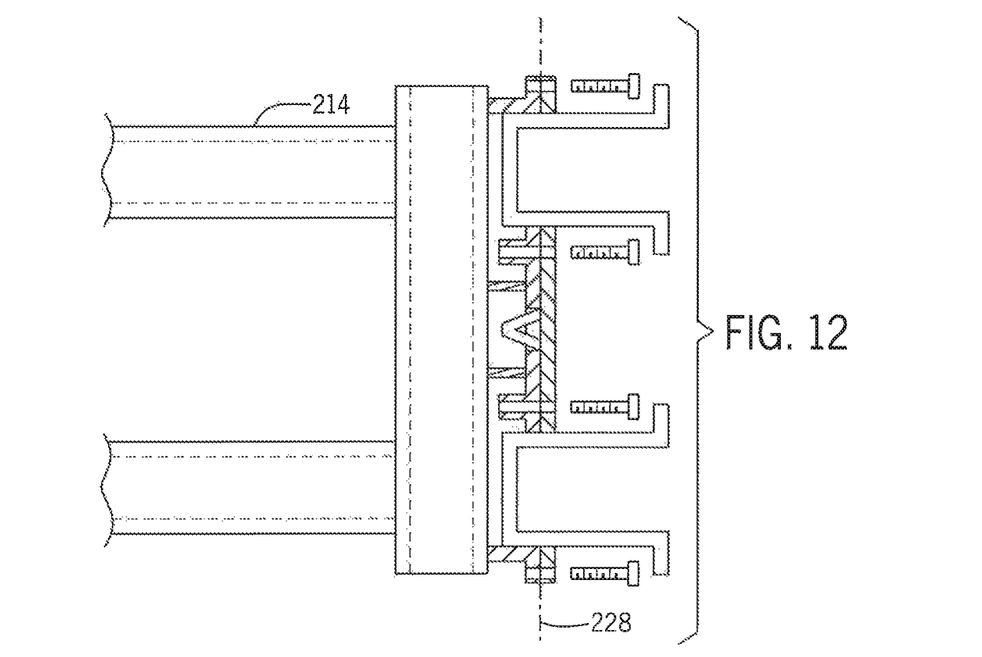
Figure 13:
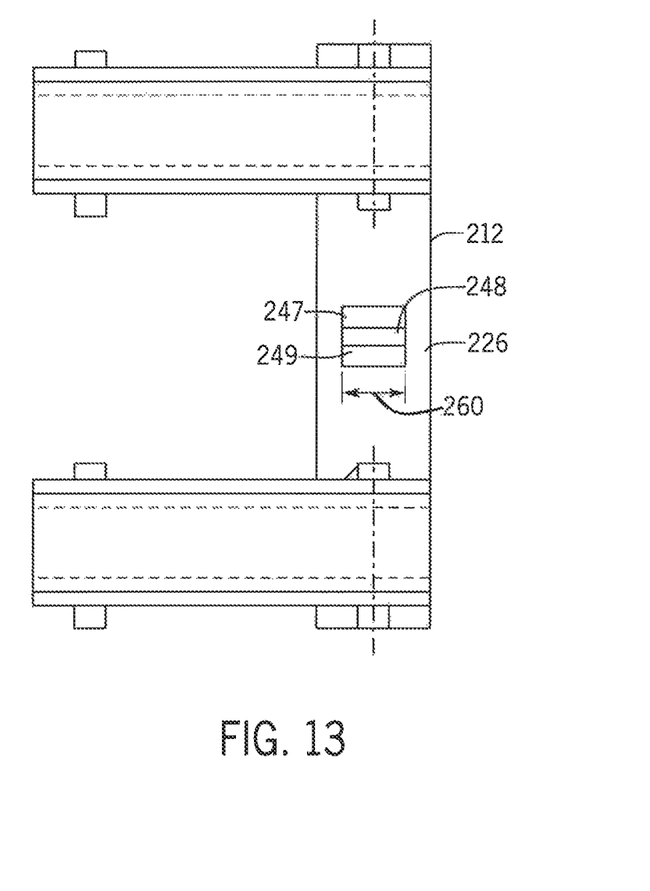

In similar fashion, FIGS. 11-13 illustrate an alternate embodiment of a skid alignment system 222, for aligning an equipment skid 212 on the frame 214 of an agricultural product applicator, in a similar manner to that described above with reference to the first exemplary embodiment of the applicator 10 and the first alternate embodiment of the skid alignment system 122.

The second alternate embodiment of the alignment system 222 includes a frame mounting surface 224 defined by the frame 214, and a skid mounting surface 226 defined by the skid 212, with the frame and skid mounting surfaces 224, 228 being adapted for mating connection with one another to substantially align the skid 212 with the frame 214 along a mounting plane 228 including and defined by the frame mounting surface 224.

A pair of laterally-spaced, juxtaposed, vertically extending skid alignment features are defined by opposite edges 234,236 of a slot 237 located generally in the center of the frame mounting surface 224. A skid-mounted alignment block 248 extends from the skid mounting surface 226 and is adapted for insertion between and into operative engagement with the pair of skid alignment features, formed by the edges 234,236 of the slot 237 for aligning the skid 212 with the frame 214 on the frame mounting plane 228. The skid alignment block 248 has sides 247,249 contoured to provide a pointed shape to the alignment block 248 for engaging the edges 234,236 of the slot 237 to facilitate guiding the skid 212 into alignment with the frame 214. As shown in FIG. 13, the alignment block 248 may be shaped to have a contour or dimension 260 that provides clearance within the slot 237 for the alignment block 248, to thereby allow the alignment block 248 to move, or float slightly, in a desired direction with the alignment block 248 engaging the edges 234,236 of the slot 237.

From the foregoing description, it will be appreciated that the invention provides an improved apparatus and method for aligning skid-mounted application equipment onto the frame of an applicator, in a manner that is considerably more precise and less cumbersome than in prior approaches wherein skid-mounted equipment had to be manually guided onto the frame of the applicator in such a manner that mounting holes and features were properly aligned.

Those having skill in the art will appreciate that, although the exemplary embodiments described herein were directed specifically to a skid mounting surface abutting a frame mounting surface at the rear of an agricultural product applicator, the invention is not limited to such an orientation and use. The invention may be practiced with efficacy in aligning equipment attached to other surfaces of an agricultural applicator, or brought into contact from other directions. Furthermore, it will be understood that the invention is not limited to attachment of skids to frames of agricultural applicators, hut may have wider use within the scope of the invention.

Use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. It is anticipated that those having skill in the art may employ such variations as appropriate, and further anticipated that the invention can be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for aligning an equipment skid on a frame of an agricultural product applicator defining substantially mutually perpendicular fore-aft, transverse and vertical axes of the frame, the alignment system comprising:
    a vertically extending frame mounting surface defined by the frame;
    a pair of laterally-spaced, juxtaposed, vertically extending skid alignment features projecting from the frame mounting surface, the pair of skid alignment features defining an insertion cavity therebetween;
    a vertically extending skid mounting surface defined by the skid;
    a vertically extending skid-mounted alignment block extending from the skid mounting surface, the skid-mounted alignment block adapted for insertion into the insertion cavity between the pair of skid alignment features and into operative engagement with the pair of skid alignment features for aligning the skid with the frame;

wherein:

the skid-mounted alignment block is adapted to be brought into an alignment position by insertion into the insertion cavity between the pair of skid alignment features by horizontally moving at least one of the frame and the skid toward each other along an axis perpendicular to the frame mounting surface and the skid mounting surface and by vertically moving the skid mounting surface along a plane generally parallel to the frame mounting surface; and the vertically extending frame mounting surface and the vertically extending skid mounting surface are in operative contact with the skid-mounted alignment block in the alignment position.

2. The alignment system of claim 1, wherein the skid alignment features are facing edges of spaced, substantially parallel, vertically extending frame-mounted alignment bars fixedly attached to the frame and extending outward from the frame mounting surface.

3. The alignment system of claim 2, further comprising:

a second pair of laterally-spaced, juxtaposed, vertically extending skid alignment features defined by the frame mounting surface; and a second skid-mounted alignment block extending from the skid mounting surface and adapted for insertion between and engagement with the second pair of skid alignment features for aligning the skid with the frame along the vertically extending mounting plane.

4. The alignment system of claim 3, wherein the second set of skid alignment features are facing edges of a second set of spaced, substantially parallel, vertically extending frame-mounted alignment bars fixedly attached to the frame and extending outward from the mounting surface of the frame.

5. A system for aligning an equipment skid on a frame of an agricultural product applicator defining substantially mutually perpendicular fore-aft, transverse and vertical axes of the frame, the alignment system comprising:

a vertically extending frame mounting surface defined by the frame;

a pair of laterally-spaced, juxtaposed, vertically extending skid alignment features projecting from the frame mounting surface, the pair of skid alignment features defining an insertion cavity therebetween;

a vertically extending skid mounting surface defined by the skid; and a vertically extending skid-mounted alignment block extending from the skid mounting surface, the skid-mounted alignment block adapted for insertion into the insertion cavity between the pair of skid alignment features and into operative engagement with the pair of skid alignment features for aligning the skid with the frame;

wherein:

the skid-mounted alignment block is adapted to be inserted into the insertion cavity between the pair of skid alignment features by horizontally moving at least one of the frame and the skid toward each other along an axis perpendicular to the frame mounting surface and the skid mounting surface and by vertically moving the skid mounting surface along a plane generally parallel to the frame mounting surface; and the frame and skid are further configured for mating contact along a substantially horizontally extending mounting surface of the frame defining and forming part of a substantially horizontally extending mounting plane, and the skid-mounted alignment block is brought into position between the alignment features of the vertically extending frame mounting surface by moving the skid parallel to the horizontal mounting plane as the vertically extending mounting surfaces of the frame and skid are brought into operative contact with one another.

6. A system for aligning an equipment skid on a frame of an agricultural product applicator defining substantially mutually perpendicular fore-aft, transverse and vertical axes of the frame, the alignment system comprising:

a vertically extending frame mounting surface defined by the frame;

a pair of laterally-spaced, juxtaposed, vertically extending skid alignment features projecting from the frame mounting surface, the pair of skid alignment features defining an insertion cavity therebetween;

a vertically extending skid mounting surface defined by the skid; and a vertically extending skid-mounted alignment block extending from the skid mounting surface, the skid-mounted alignment block adapted for insertion into the insertion cavity between the pair of skid alignment features and into operative engagement with the pair of skid alignment features for aligning the skid with the frame;

wherein:

the skid-mounted alignment block is adapted to be inserted into the insertion cavity between the pair of skid alignment features by horizontally moving at least one of the frame and the skid toward each other along an axis perpendicular to the frame mounting surface and the skid mounting surface and by vertically moving the skid mounting surface along a plane generally parallel to the frame mounting surface;

the skid alignment features are facing edges of spaced, substantially parallel, vertically extending frame-mounted alignment bars fixedly attached to the frame and extending outward from the frame mounting surface; and the frame and skid are further configured for mating contact along a substantially horizontally extending mounting surface of the frame defining and forming part of a substantially horizontally extending mounting plane, and the skid-mounted alignment block is brought into position between the alignment features of the vertically extending frame mounting surface by moving the skid parallel to the horizontal mounting plane as the vertically extending mounting surfaces of the frame and skid are brought into operative contact with one another.

7. A system for aligning an equipment skid on a frame of an agricultural product applicator defining substantially mutually perpendicular fore-aft, transverse and vertical axes of the frame, the alignment system comprising:

a vertically extending frame mounting surface defined by the frame;

a pair of laterally-spaced, juxtaposed, vertically extending skid alignment features projecting from the frame mounting surface, the pair of skid alignment features defining an insertion cavity therebetween;

a vertically extending skid mounting surface defined by the skid;

a vertically extending skid-mounted alignment block extending from the skid mounting surface, the skid-mounted alignment block adapted for insertion into the insertion cavity between the pair of skid alignment features and into operative engagement with the pair of skid alignment features for aligning the skid with the frame;

a second pair of laterally-spaced, juxtaposed, vertically extending skid alignment features defined by the frame mounting surface; and a second skid-mounted alignment block extending from the skid mounting surface and adapted for insertion between and engagement with the second pair of skid alignment features for aligning the skid with the frame along the vertically extending mounting plane;

wherein:

the skid-mounted alignment block is adapted to be inserted into the insertion cavity between the pair of skid alignment features by horizontally moving at least one of the frame and the skid toward each other along an axis perpendicular to the frame mounting surface and the skid mounting surface and by vertically moving the skid mounting surface along a plane generally parallel to the frame mounting surface;

the skid alignment features are facing edges of spaced, substantially parallel, vertically extending frame-mounted alignment bars fixedly attached to the frame and extending outward from the frame mounting surface;

the second set of skid alignment features are facing edges of a second set of spaced, substantially parallel, vertically extending frame-mounted alignment bars fixedly attached to the frame and extending outward from the mounting surface of the frame; and the vertical mounting plane is defined by an aft-facing, substantially vertical surface of the frame, such that the frame and skid mounting surfaces align the skid along the fore-aft axis of the frame, and the frame-mounted alignment bars and skid-mounted alignment blocks align the skid transversely on the frame.

8. An agricultural product applicator, comprising a skid for mounting equipment on a frame of the applicator, where the frame defines substantially mutually perpendicular fore-aft, transverse and vertical axes of the frame, and the skid and frame are adapted for alignment of the skid on the frame by a skid alignment system including:

a vertically extending frame mounting surface defined by the frame, and a vertically extending skid mounting surface defined by the skid;

a pair of laterally-spaced, juxtaposed, vertically extending skid alignment features projecting from the frame mounting surface, the pair of skid alignment features defining an insertion cavity therebetween; and a skid-mounted alignment block extending from the skid mounting surface and adapted for insertion into the insertion cavity between the pair of skid alignment features and into operative engagement with the pair of skid alignment features for aligning the skid with the frame on a plane generally parallel to the frame mounting surface;

wherein:

the skid-mounted alignment block is adapted to be brought into an alignment position by insertion into the insertion cavity between the pair of skid alignment features by horizontally moving at least one of the frame and the skid toward each other along an axis perpendicular to the frame mounting surface and the skid mounting surface and by vertically moving the skid mounting surface along the ft parallel plane; and the vertically extending frame mounting surface and the vertically extending skid mounting surface are in operative contact with the skid-mounted alignment block in the alignment position.

9. The agricultural product applicator of claim 8, wherein the skid aligning features are facing edges of spaced, substantially parallel, vertically extending frame-mounted alignment bars fixedly attached to the frame and extending outward from the mounting surface of the frame.

10. The agricultural product applicator of claim 9, further comprising:

a second pair of laterally-spaced, juxtaposed, vertically extending skid alignment features defined by the frame mounting surface; and a second skid-mounted alignment block extending from the skid mounting surface and adapted for insertion between and engagement with the second pair of skid alignment features for aligning the skid with the frame along the vertically extending mounting plane.

11. The agricultural product applicator of claim 10, wherein the second set of skid alignment features are facing edges of a second set of spaced, substantially parallel, vertically extending frame-mounted alignment bars fixedly attached to the frame and extending outward from the frame mounting surface.

12. An agricultural product applicator, comprising a skid for mounting equipment on a frame of the applicator, where the frame defines substantially mutually perpendicular fore-aft, transverse and vertical axes of the frame, and the skid and frame are adapted for alignment of the skid on the frame by a skid alignment system including:

a vertically extending frame mounting surface defined by the frame, and a vertically extending skid mounting surface defined by the skid;

a pair of laterally-spaced, juxtaposed, vertically extending skid alignment features projecting from the frame mounting surface, the pair of skid alignment features defining an insertion cavity therebetween; and a skid-mounted alignment block extending from the skid mounting surface and adapted for insertion into the insertion cavity between the pair of skid alignment features and into operative engagement with the pair of skid alignment features for aligning the skid with the frame on a plane generally parallel to the frame mounting surface;

wherein:

the skid-mounted alignment block is adapted to be inserted into the insertion cavity between the pair of skid alignment features by horizontally moving at least one of the frame and the skid toward each other along an axis perpendicular to the frame mounting surface and the skid mounting surface and by vertically moving the skid mounting surface along the parallel plane; and the frame and skid are further configured for mating contact along a substantially horizontally extending mounting surface of the frame defining and forming part of a substantially horizontally extending mounting plane, and the skid-mounted alignment block is brought into position between the alignment features of the vertically extending frame mounting surface by moving the skid parallel to the horizontal mounting plane as the vertically extending mounting surfaces of the frame and skid are brought into operative contact with one another.

13. An agricultural product applicator, comprising a skid for mounting equipment on a frame of the applicator, where the frame defines substantially mutually perpendicular fore-aft, transverse and vertical axes of the frame, and the skid and frame are adapted for alignment of the skid on the frame by a skid alignment system including:
- a vertically extending frame mounting surface defined by the frame, and a vertically extending skid mounting surface defined by the skid;
- a pair of laterally-spaced, juxtaposed, vertically extending skid alignment features projecting from the frame mounting surface, the pair of skid alignment features defining an insertion cavity therebetween; and
- a skid-mounted alignment block extending from the skid mounting surface and adapted for insertion into the insertion cavity between the pair of skid alignment features and into operative engagement with the pair of skid alignment features for aligning the skid with the frame on a plane generally parallel to the frame mounting surface;

wherein:
- the skid-mounted alignment block is adapted to be inserted into the insertion cavity between the pair of skid alignment features by horizontally moving at least one of the frame and the skid toward each other along an axis perpendicular to the frame mounting surface and the skid mounting surface and by vertically moving the skid mounting surface along the parallel plane;
- the skid aligning features are facing edges of spaced, substantially parallel, vertically extending frame-mounted alignment bars fixedly attached to the frame and extending outward from the mounting surface of the frame; and
- the frame and skid are further configured for mating contact along a substantially horizontally extending mounting surface of the frame defining and forming part of a substantially horizontally extending mounting plane, and the skid-mounted alignment block is brought into position between the alignment features of the vertically extending frame mounting surface by moving the skid parallel to the horizontal mounting plane as the vertically extending mounting surfaces of the frame and skid are brought into operative contact with one another.

14. An agricultural product applicator, comprising a skid for mounting equipment on a frame of the applicator, where the frame defines substantially mutually perpendicular fore-aft, transverse and vertical axes of the frame, and the skid and frame are adapted for alignment of the skid on the frame by a skid alignment system including:
- a vertically extending frame mounting surface defined by the frame, and a vertically extending skid mounting surface defined by the skid;
- a pair of laterally-spaced, juxtaposed, vertically extending skid alignment features projecting from the frame mounting surface, the pair of skid alignment features defining an insertion cavity therebetween;
- a skid-mounted alignment block extending from the skid mounting surface and adapted for insertion into the insertion cavity between the pair of skid alignment features and into operative engagement with the pair of skid alignment features for aligning the skid with the frame on a plane generally parallel to the frame mounting surface;
- a second pair of laterally-spaced, juxtaposed, vertically extending skid alignment features defined by the frame mounting surface; and
- a second skid-mounted alignment block extending from the skid mounting surface and adapted for insertion between and engagement with the second pair of skid alignment features for aligning the skid with the frame along the parallel plane;

wherein:
- the skid-mounted alignment block is adapted to be inserted into the insertion cavity between the pair of skid alignment features by horizontally moving at least one of the frame and the skid toward each other along an axis perpendicular to the frame mounting surface and the skid mounting surface and by vertically moving the skid mounting surface along the parallel plane;
- the skid aligning features are facing edges of spaced, substantially parallel, vertically extending frame-mounted alignment bars fixedly attached to the frame and extending outward from the mounting surface of the frame;
- the second set of skid alignment features are facing edges of a second set of spaced, substantially parallel, vertically extending frame-mounted alignment bars fixedly attached to the frame and extending outward from the frame mounting surface; and
- the vertical mounting plane is defined by an aft-facing, substantially vertical surface of the frame, such that the frame and skid mounting surfaces align the skid along the fore-aft axis of the frame, and the frame-mounted alignment bars and skid-mounted alignment blocks align the skid transversely on the frame.

15. A method for aligning an equipment skid on the frame of an agricultural product applicator defining substantially mutually perpendicular fore-aft, transverse and vertical axes of the frame, the method comprising:
- aligning the skid on the frame using an alignment system including:
  - a vertically extending frame mounting surface defined by the frame;
  - a vertically extending skid mounting surface defined by the skid;
  - a pair of laterally-spaced, juxtaposed, vertically extending skid alignment features extending from the frame mounting surface, the pair of skid alignment features defining an insertion cavity therebetween; and
  - a skid-mounted alignment block extending from the skid mounting surface and adapted for insertion into the insertion cavity between the pair of skid alignment features and into operative engagement with the pair of skid alignment features for aligning the skid with the frame on a plane generally parallel to the frame mounting surface; and
- selectively inserting the skid-mounted alignment block into an alignment position by inserting the skid-mounted alignment block into the insertion cavity between the pair of skid alignment features by horizontally moving at least one of the frame and the skid toward each other along an axis perpendicular to the frame mounting surface and the skid mounting surface and by vertically moving the skid mounting surface along the parallel plane;

wherein the vertically extending frame mounting surface and the vertically extending skid mounting surface are in operative contact with the skid-mounted alignment block in the alignment position.

16. The alignment method of claim 15, wherein the skid alignment features are facing edges of spaced, substantially parallel, vertically extending frame-mounted alignment bars fixedly attached to the frame and extending outward from the frame mounting surface, and the method includes bringing the skid-mounted alignment block into engagement between the frame-mounted alignment bars.

17. A method for aligning an equipment skid on the frame of an agricultural product applicator defining substantially mutually perpendicular fore-aft, transverse and vertical axes of the frame, the method comprising:
aligning the skid on the frame using an alignment system including:
a vertically extending frame mounting surface defined by the frame;
a vertically extending skid mounting surface defined by the skid;
a pair of laterally-spaced, juxtaposed, vertically extending skid alignment features extending from the frame mounting surface, the pair of skid alignment features defining an insertion cavity therebetween; and
a skid-mounted alignment block extending from the skid mounting surface and adapted for insertion into the insertion cavity between the pair of skid alignment features and into operative engagement with the pair of skid alignment features for aligning the skid with the frame on a plane generally parallel to the frame mounting surface; and
selectively inserting the skid-mounted alignment block into the insertion cavity between the pair of skid alignment features by horizontally moving at least one of the frame and the skid toward each other along an axis perpendicular to the frame mounting surface and the skid mounting surface and by vertically moving the skid mounting surface along the parallel plane;
wherein:
the skid alignment features are facing edges of spaced, substantially parallel, vertically extending frame-mounted alignment bars fixedly attached to the frame and extending outward from the frame mounting surface, and the method includes bringing the skid-mounted alignment block into engagement between the frame-mounted alignment bars; and
the frame and skid are further configured for mating contact along a substantially horizontally extending mounting surface of the frame defining and forming part of a substantially horizontally extending mounting plane, and the method further includes bringing the skid-mounted alignment block into position between the alignment features of the vertically extending frame mounting surface by moving the skid parallel to the horizontal mounting plane as the vertically extending mounting surfaces of the frame and skid are brought into operative contact with one another.

18. The alignment method of claim 17, wherein the alignment system further includes a second pair of laterally-spaced, juxtaposed, vertically extending skid alignment features defined by the frame mounting surface, and a second skid-mounted alignment block extending from the skid mounting surface and adapted for insertion between and engagement with the second pair of skid alignment features for aligning the skid with the frame along the mounting plane, and the method further includes bringing both the first and second skid-mounted alignment blocks into engagement respectively with the first and second sets of frame-mounted alignment features.

19. The alignment method of claim 18, wherein the second set of skid alignment features are facing edges of a second set of spaced, substantially parallel, vertically extending frame-mounted alignment bars fixedly attached to the frame and extending outward from the mounting surface of the frame, and the method includes bringing the second skid-mounted alignment block into operative engagement with the second set of frame-mounted alignment bars.

20. The alignment method of claim 19, wherein the vertical mounting plane is defined by an aft-facing, substantially vertical surface of the frame, such that the frame and skid mounting surfaces align the skid along the fore-aft axis of the frame, and the frame-mounted alignment bars and skid-mounted alignment blocks align the skid transversely on the frame, and the method includes moving the skid in a forward direction along the horizontal mounting plane to operatively engage the alignment system for aligning the skid on the frame.

* * * * *